United States Patent
Jones et al.

(10) Patent No.: US 8,033,504 B2
(45) Date of Patent: Oct. 11, 2011

(54) SYSTEM, METHOD AND APPARATUS FOR WINDBLAST REDUCTION DURING RELEASE OR EJECTION FROM AIRCRAFT

(75) Inventors: Mike I. Jones, Azle, TX (US); Glenn W. Baird, Forth Worth, TX (US); Eric F. Charlton, Grapevine, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 650 days.

(21) Appl. No.: 12/145,558

(22) Filed: Jun. 25, 2008

(65) Prior Publication Data

US 2009/0321570 A1    Dec. 31, 2009

(51) Int. Cl.
*B64D 25/10* (2006.01)
*B64D 1/00* (2006.01)

(52) U.S. Cl. .................. 244/122 A; 244/137.1; 244/141

(58) Field of Classification Search .................. 244/141, 244/130, 137.4, 122 AE, 122 AF, 122 AG, 244/137.1
See application file for complete search history.

(56) References Cited

U.S. PATENT DOCUMENTS

| | | | |
|---|---|---|---|
| 3,726,499 A * | 4/1973 | Stencel | 244/141 |
| 3,755,182 A | 8/1973 | Marshall | |
| 3,773,947 A | 11/1973 | Boyars et al. | |
| 3,775,199 A | 11/1973 | Boyars et al. | |
| 3,877,882 A | 4/1975 | Lette et al. | |
| 4,301,983 A | 11/1981 | Horan | |
| 4,436,262 A | 3/1984 | Cummings | |
| 4,525,226 A | 6/1985 | Artz et al. | |
| 4,592,523 A | 6/1986 | Herndon | |
| 5,131,608 A | 7/1992 | Ash et al. | |
| 5,557,062 A | 9/1996 | MacLaren et al. | |
| 6,206,326 B1 * | 3/2001 | Stanek et al. | 244/137.4 |
| 6,299,743 B1 | 10/2001 | Oloman et al. | |
| 6,315,245 B1 | 11/2001 | Ruff | |
| 6,446,904 B1 * | 9/2002 | Stanek | 244/130 |
| 6,835,298 B2 | 12/2004 | Oloman et al. | |

* cited by examiner

*Primary Examiner* — Galen Barefoot
(74) *Attorney, Agent, or Firm* — Bracewell & Giuliani LLP

(57) ABSTRACT

The invention reduces the impact of flowfield forces on objects launched from high speed aircraft during flight. For example, the invention provides a solution for overcoming ejection windblast injuries to pilots and increases the probability of injury-free or low-injury ejection. The gas flow is used to rapidly create a very short duration protective "bubble" in the incoming air flow ahead of the ejecting pilot. The bubble reduces the local flow velocity and aerodynamic forces on the pilot during the injury-critical time period of ejection. The invention also is suitable for reducing the intensity of flowfield forces that act on released military aircraft ordnance, such as bombs and missiles.

18 Claims, 5 Drawing Sheets

SYSTEM, METHOD AND APPARATUS FOR WINDBLAST REDUCTION DURING RELEASE OR EJECTION FROM AIRCRAFT

This invention was made with Government support under Contract Number N00019-02-C-3002 awarded by The Department of the Navy. The Government has certain rights in this invention.

BACKGROUND OF THE INVENTION

1. Technical Field

The present invention relates in general to releasing objects from aircraft during high speed flight and, in particular, to an improved system, method and apparatus for reducing windblast injuries to pilots when they eject from the cockpit of a high speed aircraft.

2. Description of the Related Art

When aircraft pilots are forced to eject from cockpits at very high air speeds, they are subjected to instantaneous and near-lethal aerodynamic forces from the air flowfield coming over the canopy. Snap back neck injuries and facial and/or eye tissue damage are particularly common due to the body trajectory during ejection insertion into the flowfield and the fact that the head, helmet and visor enter the flowfield before the rest of the body. These factors create highly asymmetric and dangerous aerodynamic loading on the pilots body.

At near-transonic speeds, the probability of ejection survival without serious injury or death approaches zero. For some aircraft applications, the ejection requirement is 600 knots indicated airspeed (i.e., nearly Mach 1.0 at an altitude of 20,000 feet). However, the local flowfield over the top of the canopy that impacts the ejecting pilot can approach 650 knots or more (i.e., about Mach 1.06 at 20,000 feet), creating an almost unsurvivable ejection environment for pilots.

Similarly, the same intensity of air flowfield forces act on military aircraft ordnance, such as bombs and missiles, as they are released from aircraft during high speed flight. When the ordnance is released, the flowfields can tend to force the ordnance back toward the aircraft, which can create hazardous conditions for the aircraft and pilot as well as damage the ordnance or affect its mission. Thus, a solution for addressing these issues would be desirable.

SUMMARY OF THE INVENTION

Embodiments of a system, method and apparatus for reducing the impact of flowfield forces on objects released, launched or jettisoned from high speed aircraft during flight are disclosed. For example, the invention provides a solution for overcoming ejection windblast injuries to pilots and increases the probability of injury-free or low-injury ejection. Weight penalties to the aircraft from incorporating the invention are minimal when measured against the potential reduction in ejection windblast injury. The invention also is suitable for reducing the intensity of flowfield forces that act on objects released from aircraft, such as bombs and missiles on military aircraft.

In one embodiment, the transparent canopy that covers the pilot's cockpit incorporates a bowframe that is located forward of the pilot. The bowframe supports the canopy structure and helps to meet the bird strike survivability requirement for the aircraft. In one application, the bowframe is located at and constrains the aft edge of the thick acrylic interior canopy insert. The bowframe is a metal structure designed for maximum strength and minimum weight that remains attached to the canopy frame and the air frame of the aircraft after the pilot ejects.

The bowframe may be used to incorporate a highly energetic, one-shot, active fluid (e.g., gaseous) flow control system. The control system also may be located in other portions of the aircraft to achieve the same benefit. The fluid flow is used to rapidly create a very short-duration protective "bubble" in the incoming air flow ahead of the ejecting pilot. The bubble reduces the local flow velocity and aerodynamic forces on the pilot during the injury-critical time period of ejection.

The protection produced for the pilot is analogous to a mid-air, reduced-velocity, reduced-pressure "depth charge" that is somewhat similar to undersea explosive detonations. The bubble may be formed through active flow control orifices, slots and/or small arrays of expansion nozzles in the forward bowframe canopy exterior surface. The active flow may be formed by explosively venting gas a very high pressure in a forward direction into the incoming air flow over the canopy. The velocity and momentum of the vented gas temporarily redirects the oncoming flow stream to create a short-lived bubble of turbulent but lower-velocity air flow. Upon release, the protective bubble immediately begins to move and convect downstream toward the pilot's head. Thus, the timing of its formation in the pilot ejection sequence affects the protective benefit to the pilot.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 2:
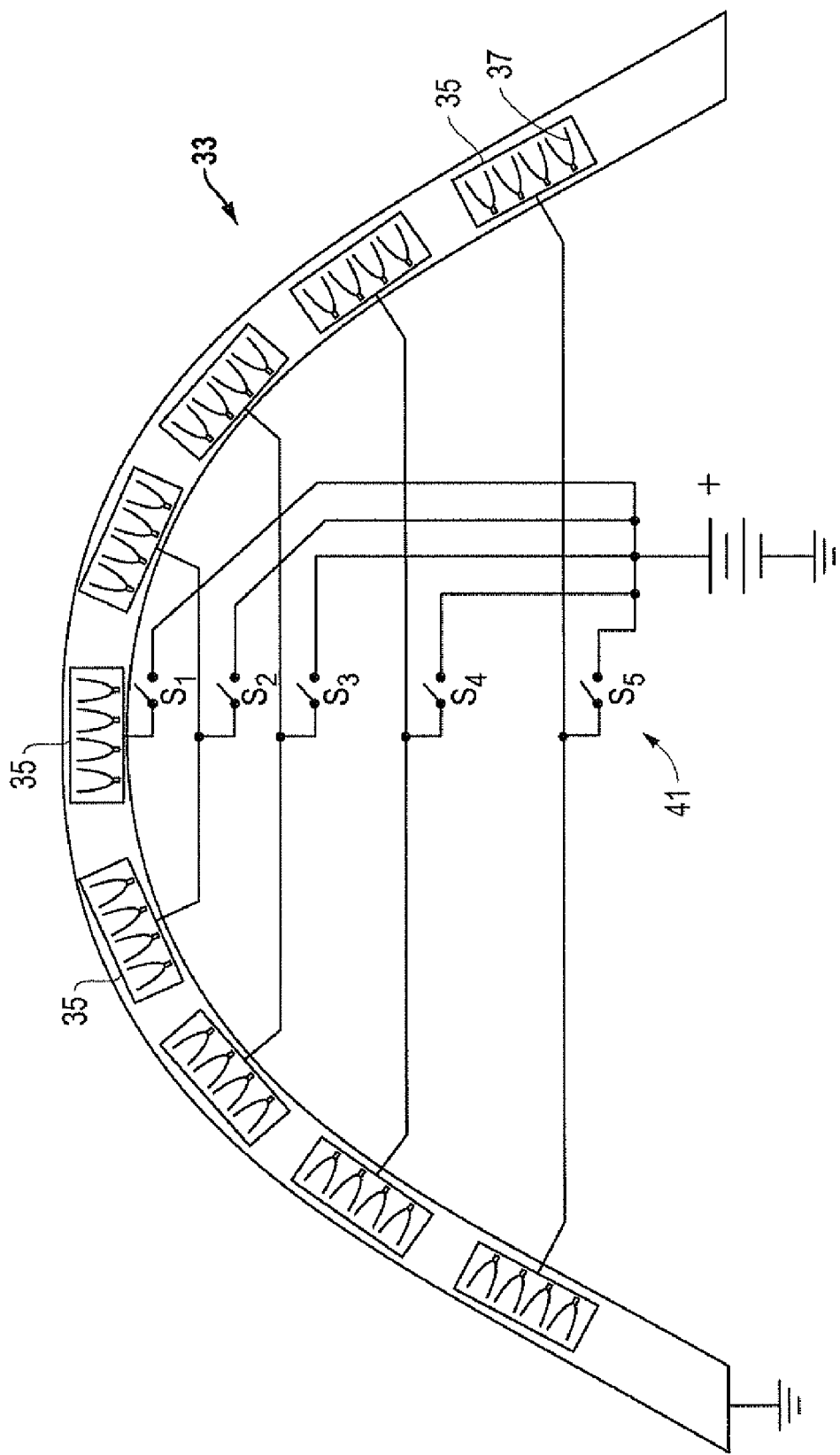
FIG. 2 is a schematic end view of one embodiment of a canopy bowframe for an aircraft and is constructed in accordance with the invention.
Figure 3:
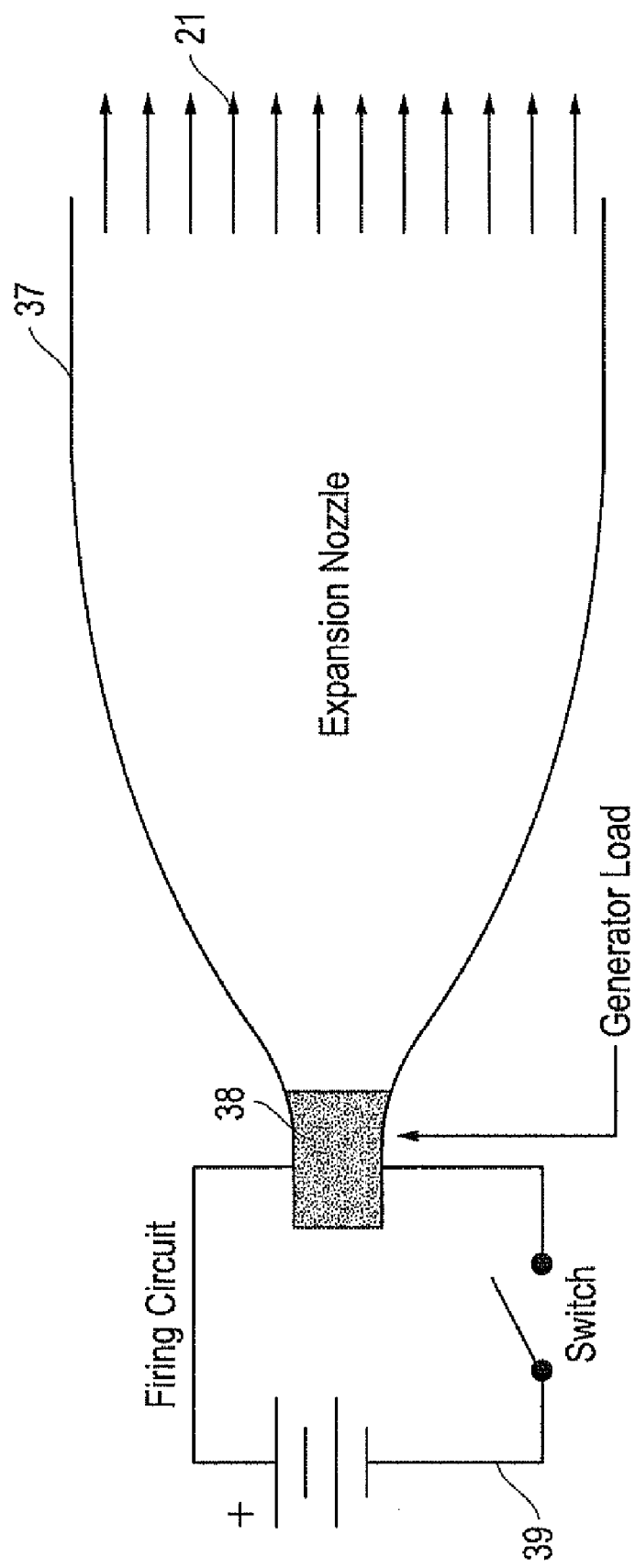
FIG. 3 is a schematic sectional side view of one embodiment of a fluid generator nozzle system for an aircraft and is constructed in accordance with the invention.
Figure 4:
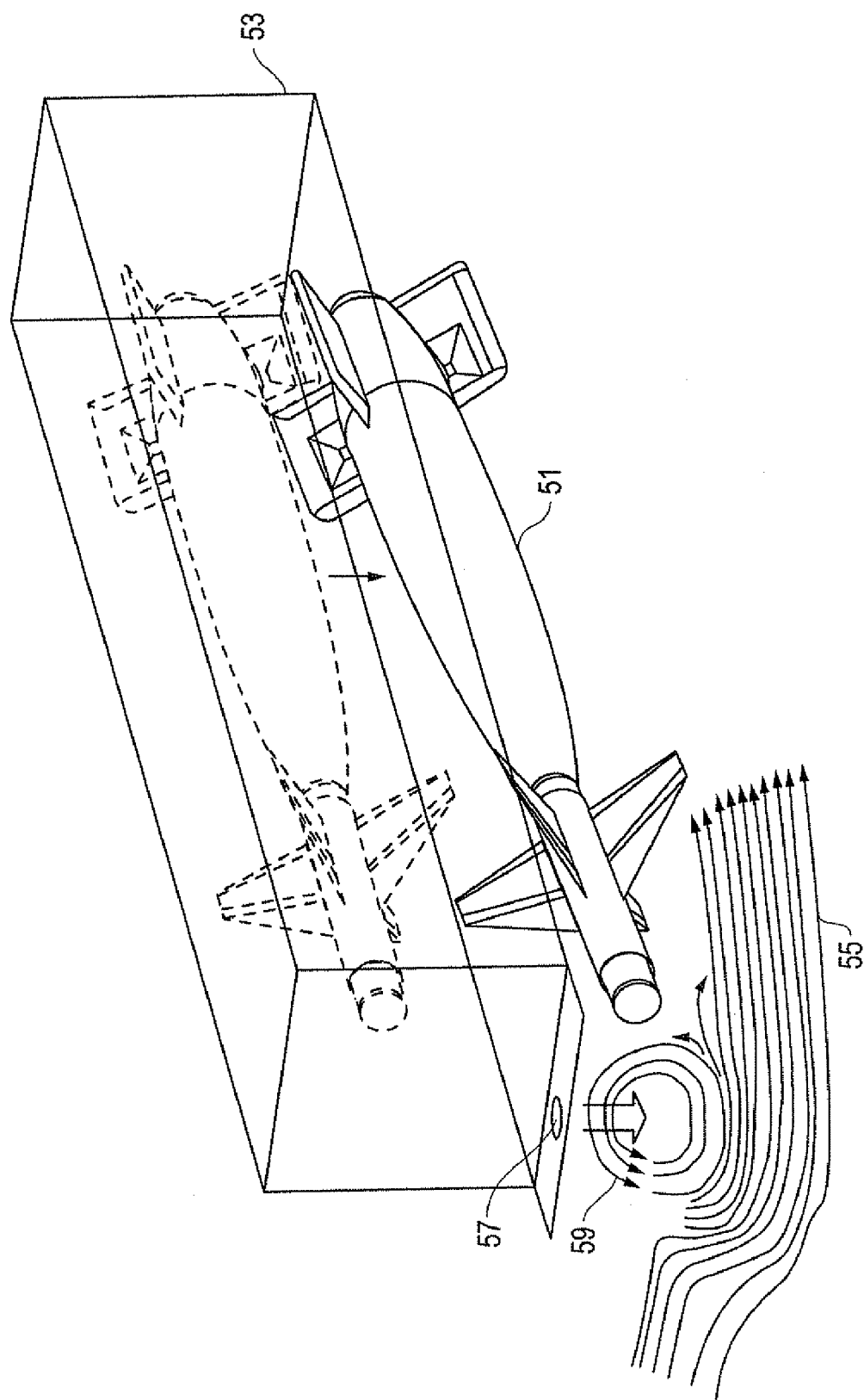
FIG. 4 is a schematic diagram of another embodiment of a fluid generator nozzle system for an aircraft and is constructed in accordance with the invention.
Figure 5:
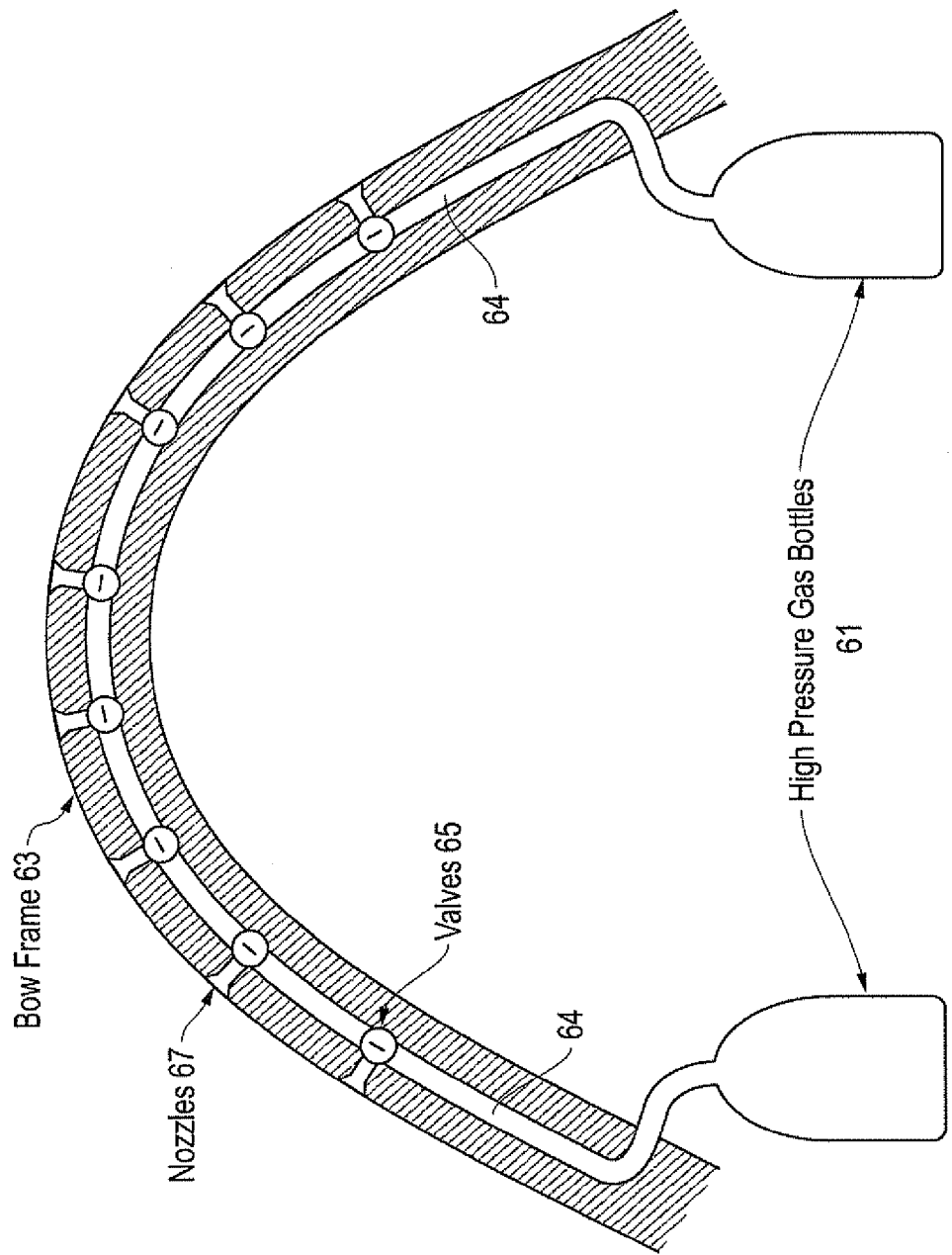
FIG. 5 is a schematic diagram of another embodiment of an aircraft canopy bowframe constructed in accordance with the invention.

Referring to FIGS. 1-5, embodiments of a system, method and apparatus for reducing the impact of flowfield forces on objects released, launched or jettisoned from high speed aircraft during flight are disclosed. Although the invention is primarily depicted and described in FIGS. 1-3 and 5 as providing a solution for overcoming ejection windblast injuries to pilots and increases the probability of injury-free or low-injury ejection, the invention has still other applications. For example, as shown in FIG. 4, the invention also is suitable for reducing the intensity of flowfield forces that act on other types of objects that are released or launched from aircraft, such as bombs, missiles, fuel tanks, etc.

Figure 1:
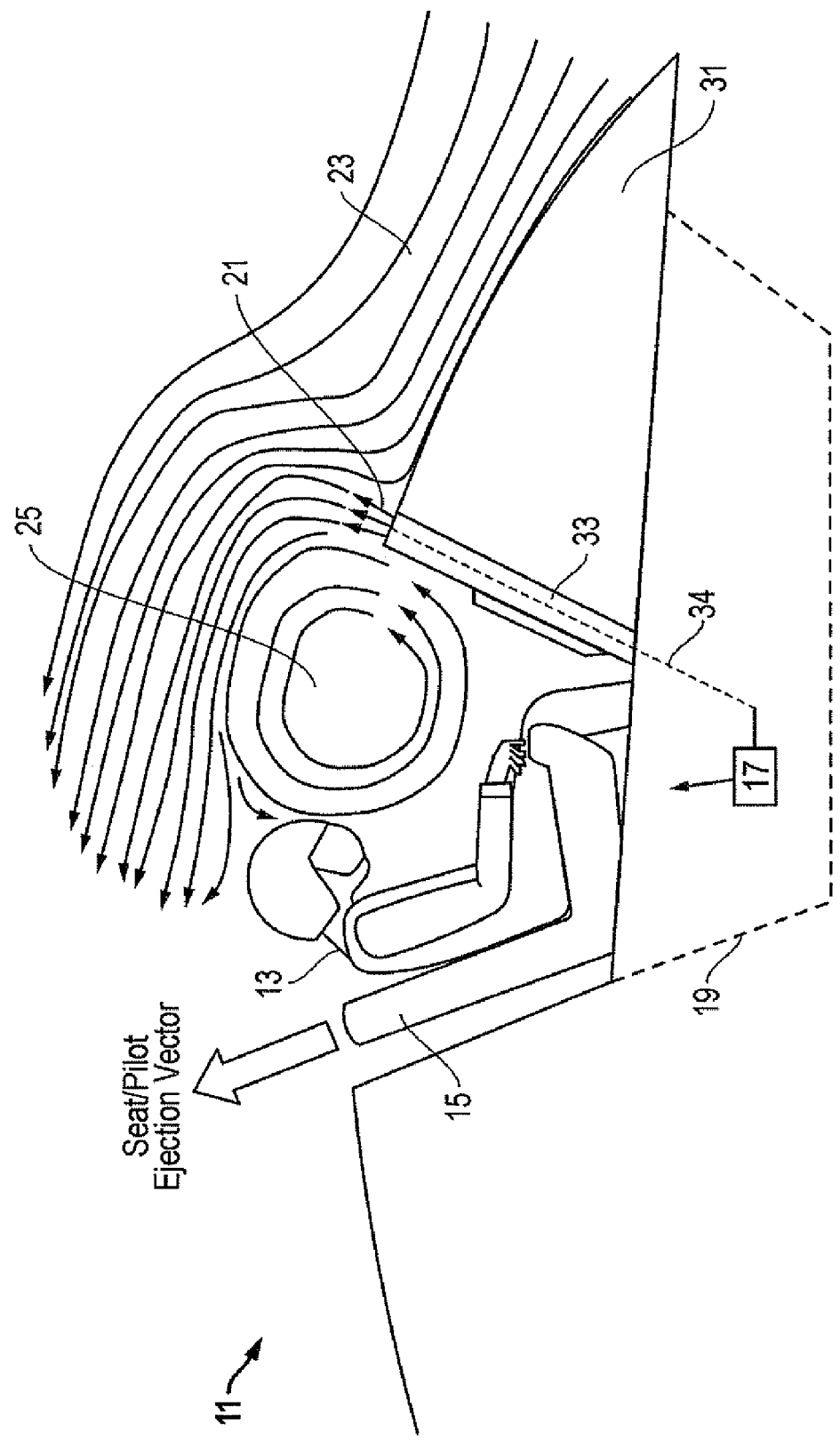
FIG. 1 is a schematic diagram of an upper portion of one embodiment of an aircraft constructed in accordance with the invention and is shown with the pilot partially ejected from the cockpit.

In one embodiment, the invention comprises a system for reducing the impact of flowfield forces on objects ejected or launched from an aircraft during flight. FIG. 1 illustrates an aircraft 11 having an object (e.g., a pilot 13 in a seat 15) releasably mounted to the aircraft. In the event of an emergency, the pilot 13 and seat 15 are selectively and forcibly ejected or released from the cockpit 19 of the aircraft via an ejection system 17. Ejection occurs during flight of the aircraft under conditions where it is safer for the pilot to leave the aircraft in mid-flight rather than remain in the aircraft.

In some embodiments, the aircraft 11 also is equipped with a protection system for emitting a fluid 21 (e.g., gas) adjacent to the object (e.g., pilot 13). The fluid 21 is released with the object 13 from the aircraft to reduce an intensity of an air flowfield 23 on the object 13 as it is being released from the aircraft. The fluid 21 is emitted into the air flowfield 23 upstream from the object 13 to form a relatively lower velocity flow or "bubble" 25. The protection system facilitates a reduction in windblast injuries to the pilot upon ejection of the pilot from the aircraft during flight of the aircraft. This system increases the probability of injury-free or low-injury ejection of the pilot.

In some embodiments, at least a portion of the canopy 31 that covers the cockpit 19 has a bowframe 33 (FIGS. 1 and 2) located upstream of the pilot 13. As illustrated, the bowframe may be used to constrain an aft edge of a portion of the canopy 31. The protection system emits the fluid 21 through apertures 35 (FIG. 2) in the bowframe 33. For example, the protection system may comprise highly energetic, one-shot, active fluid flow control that rapidly forms the very short-duration protective bubble 25 (FIG. 1) in the air flowfield 23 ahead of the ejecting pilot 13. The protective bubble 25 reduces a local flow velocity and aerodynamic forces on the pilot during ejection.

As shown in FIG. 2, the apertures may comprise an array of slots 35 about the sides and top of the bowframe 33. Each slot 35 may be equipped with an expansion nozzle 37 (FIGS. 2 and 3) that explosively vents the fluid 21 upon ejection of the pilot. The fluid may comprise a highly pressurized gas (FIG. 5) or a solid 38 (FIG. 3) that is detonated to release a gas, such as a nitrogen-generating compound. For example, the highly pressurized gas may comprise diatomic nitrogen, sulfur hexaflouride, etc., and may be stored in tanks 61 (FIG. 5) on board the aircraft. In other embodiments, the nitrogen-generating compound may comprise, e.g., sodium azide. The solid 38 (FIG. 3) may be electrically detonated via a firing circuit 39 upon ejection of the pilot to explosively liberate diatomic nitrogen through the slots 35 (FIG. 2).

Alternatively, the fluid may be ignited and released via a non-electrical ignition system. For example, conventional pilot ejection systems utilize an explosive "circuit" for the ejection components. This typically comprises a detonation cord 34 (see, e.g., FIG. 1) that is controlled by the ejection system. The detonation cord extends to the aircraft canopy for exploding and breaking the canopy away (only a portion of the remaining canopy is shown in FIG. 1) from the pilot immediately prior to ejection. The detonation cord may be extended to include pyrotechnic detonation of the solids 38 (FIG. 3) without electrical power.

The height, downstream mixing and convection of the protective bubble are controlled with the active flow control slot or nozzle design. The volume, sequence and expansion rate of gas required to form the flowfield bubble for significant safety benefit also may be manipulated. One embodiment of a control system for releasing the gas is shown in FIG. 2, comprising one or more (e.g., an array of) switches 41, and aperture locations 35 at the sides and top of the bowframe 33. The switches 41 can be closed simultaneously or sequentially, allowing the low velocity bubble shape and duration to be configured for proper size, timing and duration.

The three-dimensional shapes, orientations, nozzle expansion ratios, blowing angles and locations of the blowing slots 35 or nozzles 37 are defined by the application. For example, the slots may comprise thin linear slots or expansion nozzles that are generally aimed in the forward direction (i.e., in front of the pilot). Also, reactive loads against the bowframe produced by the rapidly expanding gas venting from the active flow control openings in the forward direction add vectorially to the existing aerodynamic loading and are accounted for to assure the structural integrity of the bowframe and forward canopy. The formation of an ejection protection bubble may be readily applied to any aircraft employing a forward bowframe, and extends to aircraft without bowframes wherever the active flow control and gas supply or generation sources may be stored on board the aircraft.

The protective bubble may be formed by other means as well. For example, in one embodiment, high pressure gas tanks 61 (FIG. 5) are installed adjacent the bowframe 63 along the port and starboard sides. Each tank 61 has a one-shot valve that is only opened upon the pilot's ejection from the aircraft. The high pressure tanks 61 may vent diatomic nitrogen ($N_2$) through passages 64 directly into the active flow control blowing valves 65 and form an upstream nitrogen bubble that is released through nozzles 67. Alternatively, a more massive, dense gas than nitrogen may be vented, such as pressurized sulfur hexaflouride ($SF_6$). $SF_6$ is non-toxic gas having a density of about 5 times that of nitrogen. However, this embodiment introduces more weight and volume penalties that counter improvements in pilot safety.

In another embodiment, a solid azide compound (e.g., sodium azide, $NaN_3$) is located within the active flow control slots or in the throats of expansion nozzles (see, e.g., nozzle 37 in FIG. 3). The azide is electrically detonated upon the pilot's ejection to explosively liberate massive volumes of diatomic nitrogen into the flow control slots. This embodiment offers substantial weight reduction, volume, bird strike safety and actuation simplicity compared to pressurized $N_2$ or $SF_6$ tanks.

However, this embodiment may pose some operational, storage and biological safety hazards that should be addressed. Prior to detonation, most azides are toxic to inhale and especially to ingest. However, azide reaction is essentially 100%, leaving no unreacted toxic azide compounds. Further, the pilot oxygen mask and helmet visor (if it remains in place during ejection) helps to protect the ejecting pilot from any residual unreacted azide exposure and inhalation. Moreover, the very short duration of exposure (likely in milliseconds or less) and total amount of azide compound required for protective bubble formation may be small enough to only pose a minimal health hazard when compared to 650 knot windblast injuries. Commercial automotive airbags also employ additional passivation chemistry to neutralize the reaction byproducts of $NaN_3$ detonation to prevent poisoning of automobile passengers; this invention may borrow from such commercial-off-the-shelf (COTS) technology to increase pilot safety.

In still other embodiments, the object protected by the protection system also may comprise armaments, ordnance or other objects that are selectively released from an aircraft during flight. For example, as shown in FIG. 4, a missile 51 (shown being released from an aircraft bay 53), bomb, fuel tank, small munitions, counter-measure devices, other small air-launched equipment, etc., may be at least partially shielded from the strong flowfield forces 55 that impinge on them during their release from the aircraft. As described herein, the protection system 57 reduces an intensity of air flowfield forces that act on the ordnance as it is launched from the aircraft by forming a protective low velocity flow or bubble 59.

While the invention has been shown or described in only some of its forms, it should be apparent to those skilled in the art that it is not so limited, but is susceptible to various changes without departing from the scope of the invention. For example, in still other embodiments, there are several different chemical-based "nitrogen generators" (other than azides) that are capable of rapidly liberating huge volumes of nitrogen in explosive expansions to protect the pilot during high velocity ejection.

What is claimed is:

1. A system for reducing the impact of flowfield forces on objects launched from an aircraft during flight, comprising:
   an aircraft having an object releasably mounted to the aircraft for release from the aircraft during flight of the aircraft; and
   a protection system for emitting a fluid adjacent to the object during release of the object from the aircraft, and thereby reducing an intensity of an air flowfield on the object as it is being released from the aircraft, the fluid being emitted into the air flowfield upstream from the object; wherein
   the object is a seat of the aircraft and a pilot in the seat, and the protection system facilitates a reduction in windblast injuries to the pilot upon ejection of the pilot from the aircraft during flight of the aircraft, and increases a probability of injury-free or low-injury ejection of the pilot.

2. A system according to claim 1, wherein the canopy has a bowframe located upstream of the pilot, the bowframe constrains an aft edge of a portion of the canopy, and the protection system emits the fluid through apertures in the bowframe.

3. A system according to claim 2, wherein the protection system comprises a highly energetic, one-shot, active fluid flow control that rapidly forms a very short-duration protective bubble in the air flowfield ahead of the ejecting pilot, such that the protective bubble reduces a local flow velocity and aerodynamic forces on the pilot during ejection.

4. A system according to claim 3, wherein the apertures comprise an array of slots about the sides and top of the bowframe, each slot having an expansion nozzle that explosively vents the fluid upon ejection of the pilot.

5. A system according to claim 4, wherein the fluid is selected from the group consisting of a highly pressurized gas and a nitrogen-generating compound.

6. A system according to claim 5, wherein the highly pressurized gas is one of diatomic nitrogen and sulfur hexaflouride, and is stored in tanks on board the aircraft.

7. A system according to claim 5, wherein the nitrogen-generating compound comprises sodium azide, and is detonated upon ejection of the pilot to explosively liberate diatomic nitrogen through the slots.

8. A system according to claim 1, wherein the fluid emission by the protection system comprises an explosion.

9. A system for reducing the impact of an air flowfield forces on an aircraft pilot during ejection of the pilot from the aircraft during flight of the aircraft, comprising:
   an aircraft having a cockpit with a seat for a pilot and a canopy extending over at least a portion of the cockpit, and a pilot ejection system for ejecting the seat and the pilot from the cockpit during flight of the aircraft; and
   a protection system for emitting a fluid adjacent to the pilot during ejection of the seat and pilot from the aircraft, and thereby reducing an intensity of an air flowfield on the pilot as the pilot is being ejected from the aircraft, the fluid being emitted into an air flowfield upstream from the pilot to reduce windblast injuries to the pilot upon ejection of the pilot from the aircraft during flight of the aircraft, and increase a probability of injury-free or low-injury ejection of the pilot.

10. A system according to claim 9, wherein the canopy has a bowframe located upstream of the pilot, the bowframe constrains an aft edge of a portion of the canopy, and the protection system emits the fluid through apertures in the bowframe.

11. A system according to claim 10, wherein the apertures comprise an array of slots about the sides and top of the bowframe, each slot having an expansion nozzle that explosively vents the fluid upon ejection of the pilot.

12. A system according to claim 9, wherein the protection system comprises a highly energetic, one-shot, active fluid flow control that rapidly forms a very short-duration protective bubble in the air flowfield ahead of the ejecting pilot, such that the protective bubble reduces a local flow velocity and aerodynamic forces on the pilot during ejection.

13. A system according to claim 9, wherein the fluid is selected from the group consisting of a highly pressurized gas and a nitrogen-generating compound.

14. A system according to claim 13, wherein the highly pressurized gas is one of diatomic nitrogen and sulfur hexaflouride, and is stored in tanks on board the aircraft.

15. A system according to claim 13, wherein the nitrogen-generating compound comprises sodium azide, and is detonated upon ejection of the pilot to explosively liberate diatomic nitrogen through the slots.

16. A system according to claim 9, wherein the fluid emission by the protection system comprises an explosion.

17. A system for reducing the impact of an air flowfield forces on a pilot during ejection of the pilot from the aircraft during flight of the aircraft, comprising:
   an aircraft having a cockpit with a seat for a pilot and a canopy extending over at least a portion of the cockpit, the canopy having a bowframe located upstream of the pilot, the bowframe constrains an aft edge of a portion of the canopy, and a pilot ejection system for ejecting the seat and the pilot from the cockpit during flight of the aircraft;
   a protection system for emitting a gas through apertures in the bowframe adjacent to the pilot during ejection of the seat and pilot from the aircraft, and thereby reducing an intensity of an air flowfield on the pilot as the pilot is being ejected from the aircraft, the gas being emitted into an air flowfield upstream from the pilot to reduce windblast injuries to the pilot upon ejection of the pilot from the aircraft during flight of the aircraft, and increase a probability of injury-free or low-injury ejection of the pilot; and
   the protection system comprises an explosive, highly energetic, one-shot, active gas flow control that rapidly forms a very short-duration protective bubble in the air flowfield ahead of the ejecting pilot, such that the protective bubble reduces a local flow velocity and aerodynamic forces on the pilot during ejection.

18. A system according to claim 17, wherein the apertures comprise an array of slots about the sides and top of the bowframe, each slot having an expansion nozzle that explosively vents the gas upon ejection of the pilot, the gas is formed from a nitrogen-generating compound comprising sodium azide, and is detonated upon ejection of the pilot to explosively liberate diatomic nitrogen through the slots.

* * * * *